United States Patent [19]

Cueman et al.

[11] Patent Number: 5,059,800
[45] Date of Patent: Oct. 22, 1991

[54] TWO DIMENSIONAL MOSAIC SCINTILLATION DETECTOR

[75] Inventors: Michael K. Cueman, Niskayuna; Gregory A. Mohr, Scotia; Dale M. Brown, Schenectady, all of N.Y.

[73] Assignee: General Electric Company, Schenectady, N.Y.

[21] Appl. No.: 687,100

[22] Filed: Apr. 19, 1991

[51] Int. Cl.[5] ............................................. G01T 1/202
[52] U.S. Cl. .................................. 250/367; 250/368; 250/370.11
[58] Field of Search ..................... 250/367, 368, 370.11

[56] References Cited

U.S. PATENT DOCUMENTS

| | | | |
|---|---|---|---|
| 4,533,489 | 8/1985 | Utts et al. | 252/301.17 |
| 4,560,877 | 12/1985 | Hoffman | 250/366 |
| 4,560,882 | 12/1985 | Barbaric et al. | 250/487.1 |
| 4,730,108 | 8/1988 | Enck, Jr. et al. | 250/213 VT |
| 4,755,681 | 7/1988 | Oka et al. | 250/370.01 |
| 4,855,589 | 8/1989 | Enck et al. | 250/213 VT |
| 4,906,850 | 3/1990 | Beerlage | 250/370.09 |

FOREIGN PATENT DOCUMENTS

| | | | |
|---|---|---|---|
| 57-104873 | 6/1982 | Japan | 250/370.11 |
| 58-153190 | 9/1983 | Japan | 250/368 |
| 58-216973 | 12/1983 | Japan | 250/368 |
| 1525463 | 9/1978 | United Kingdom | 250/367 |

OTHER PUBLICATIONS

Ito et al., "CsI(Na) Scintillation Plate with High Spatial Resolution", I.E.E.E. Trans. on Nuclear Science, vol. NS-34, No. 1, pp. 401-405.

Dahlbom et al., "An Evaluation of a Two-Dimensional Array Detector for High Resolution PET", I.E.E.E. Trans. on Medical Imaging, vol. 7, No. 4, 12/88, pp. 265-272.

Primary Examiner—Constantine Hannaher
Attorney, Agent, or Firm—Paul R. Webb, II; James C. Davis, Jr.

[57] ABSTRACT

A two dimensional mosaic scintillation X-ray or Gamma ray detector has many mosaic elements. A reflecting means, e.g., an epoxy with TiO$_2$, is disposed between the elements to reduce optical cross-talk. The elements have wide narrow ends and either the wide ends or the narrow ends can receive the incident X-rays. A photodetector is optically coupled to the remaining ends either by being directly secured thereto or by way of a lens or optical fibers. The detector has communicating wide and narrow grooves and can be made by first forming the wide grooves from a first side and then forming the narrow grooves from the second side.

20 Claims, 5 Drawing Sheets

TWO DIMENSIONAL MOSAIC SCINTILLATION DETECTOR

This application is a continuation of application Ser. No. 07/471,753, filed Jan. 29, 1990, now abandoned.

BACKGROUND OF THE INVENTION

The present invention relates to radiation detection, and more particularly, to a two dimensional scintillation detector for high energy radiation like X-rays and Gamma rays.

Two dimensional solid state X-ray imaging and Gamma ray detectors are customarily fabricated by attaching a plate to, or depositing a layer of scintillating material over, the surface of an electronic imaging chip. The scintillating material, which produces low energy radiation in response to high energy radiation, is required because high energy radiation is not readily absorbed in standard semiconductor elements. Because Si chips are smaller than the finished X-ray imager, a mosaic of smaller chips needs to be assembled. It is desirable to eliminate the insensitive regions at the perimeter of and between the silicon chips where space for interconnecting wires and possible interface components could be mounted. Large prior art detectors made of a mosaic of these individual detectors have insensitive streaks where the individual Si detector arrays butt together. For example it is known from the article "CsI(Na) Scintillation Plate With High Spatial Resolution", by M. Ito et al., IEEE Trans. on Nuclear Science, Vol. NS-34, No.1, Feb. 1987, pp. 401–405, how to use multiple scintillator elements. However, light can pass between the elements resulting in cross-talk therebetween, which results in lower efficiency and blurred images.

It is therefore an object of the present invention to provide a radiation detector and method for making same with reduced dead spots and cross-talk, and also higher efficiency.

SUMMARY OF THE INVENTION

In brief, these and other objects are achieved by a detector in accordance with the invention for a first type of radiation comprising a plurality of means, disposed in a mosaic, for emitting a second type of radiation in response to incident radiation of the first type, each of said means being shaped to have both wide and narrow ends, one of said ends being adapted to receive the incident radiation of the first type; means for reflecting said second radiation type disposed between each of said plurality of means; and means for providing a signal in response to radiation of said second type, said providing means being optically coupled to the remaining one of said ends.

A scintillation detector in accordance with the invention comprises a slab of scintillation material having first and second sides, a plurality of narrow grooves extending from said first side, and a plurality of wide grooves extending from said second side respectively communicating with said first grooves.

A method of making a scintillation detector in accordance with the invention comprises first forming a plurality of wide grooves on a first side of a slab of scintillation material; and then forming a plurality of narrow grooves on a second side of said slab respectively communicating with said plurality of wide grooves.

BRIEF DESCRIPTION OF THE DRAWING

Corresponding reference numbers are applied to corresponding elements.

DETAILED DESCRIPTION

Figure 1:
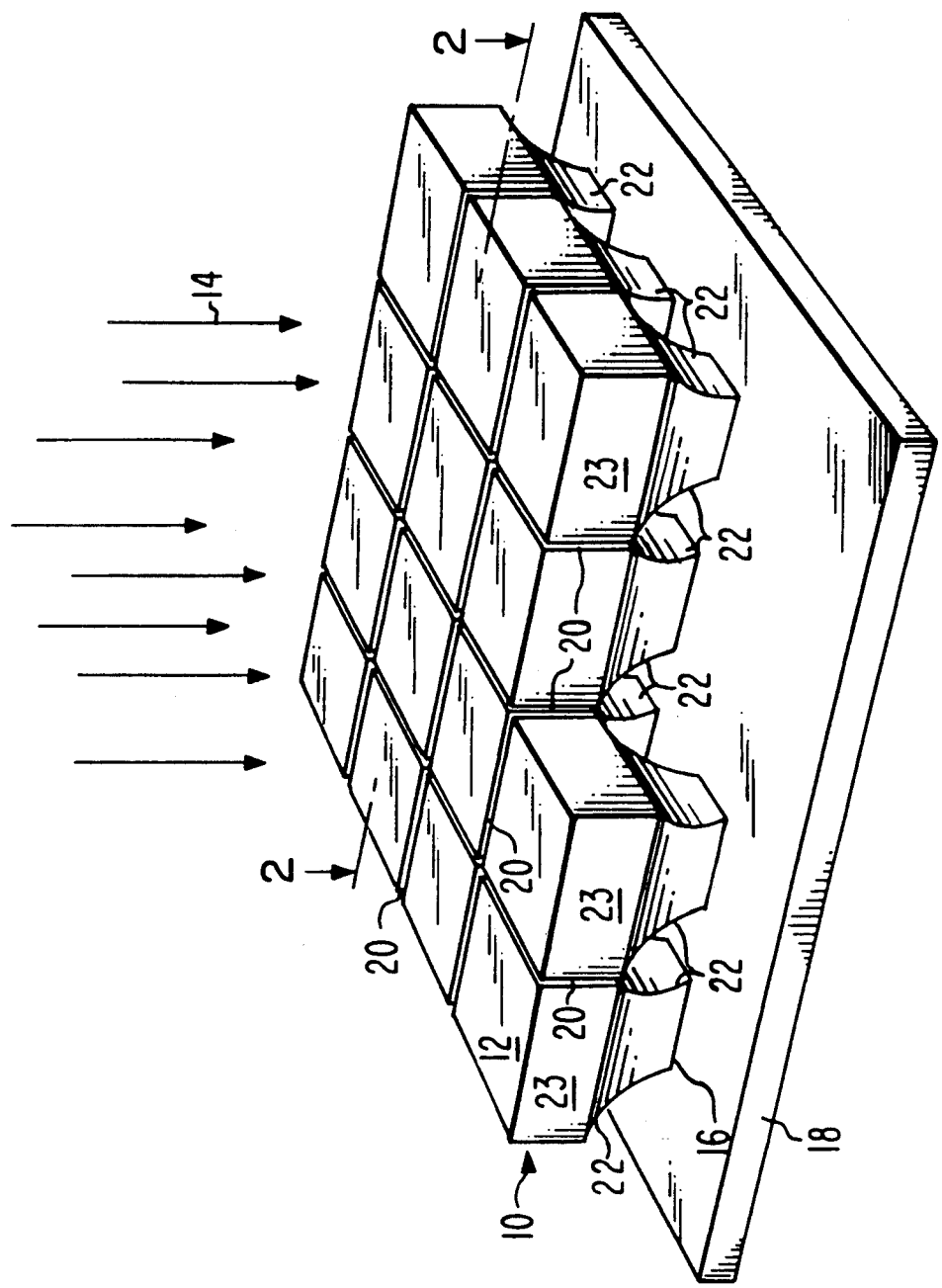
FIG. 1 is a broken away isometric view of a mosaic array in accordance with a first embodiment of the invention.

FIG. 1 shows a mosaic slab array 10 of a scintillation material having first wide ends or faces 12 disposed to receive a first type of radiation, e.g., ultraviolet light or incident X-rays 14, and second narrow ends or faces 16 secured to a semiconductor integrated circuit light detector 18 by an optically transparent glue. Extending from first ends 12 are a first plurality of narrow grooves 20, while extending from the second ends 16 are a second plurality of wide grooves 22, which respectively communicate with the first plurality of grooves 20. Thus slab 10 comprises a plurality of elements 23 defined by grooves 20 and 22. The narrowness of grooves 20 minimizes the extent of the insensitive portion of the detector since wide ends 12 occupy almost the entire area of slab 10 that receives radiation 14.

Grooves 20 and 22 can be made by first cutting wide grooves 22 in a first side of slab 10 with a wide saw blade, e.g., 100 $\mu$m in width, deeply enough, e.g. 600 $\mu$m, that the more difficult narrow cuts can be successfully made. Then slab 10 is turned over so that the second side faces the operator. The optically transparent scintillation material is illuminated, allowing the operator to see grooves 22, thus making easier the alignment of grooves 20 and 22 so they communicate. Then narrow grooves 22 are cut with narrow saw, e.g., 25 $\mu$m in width, to a typical depth of 100 $\mu$m.

The scintillation material of slab 10 can comprise a sintered rare earth ceramic oxide, such as a Y:Gd X-ray absorber. In particular, slab 10 can comprise between about 20 to 50 mole percent $Gd_2O_3$, between about one to six mole percent $Eu_2O_3$, with the remainder $Y_2O_3$. More particularly, it can comprise about 30 mole percent $Gd_2O_3$, about three mole percent $Eu_2O_3$, and about 67 mole percent $Y_2O_3$. If desired, about 0.02 mole percent $Pr_2O_3$, can be added as an afterglow reducer. Details about such materials which are good scintillators, can be found in prior art patents, e.g., U.S. Pat. No. 4,518,546. Such materials are also robust, chemically inert, stable, and micromachinable. They are also substantially transparent to the visible light band because the mixture can be sintered to nearly perfect theoretical density and exhibits a cubic crystal structure. This eliminates imperfections and changes in the index of refraction at grain boundaries, both of which cause transparency-reducing optical scattering. Thus slab 10 can be thick for good X-ray absorption without significant loss of optical sensitivity. Other transparent scintillators, e.g., BGO, which is a good X-ray absorber, might also be used as the material of slab 10.

Figure 2:
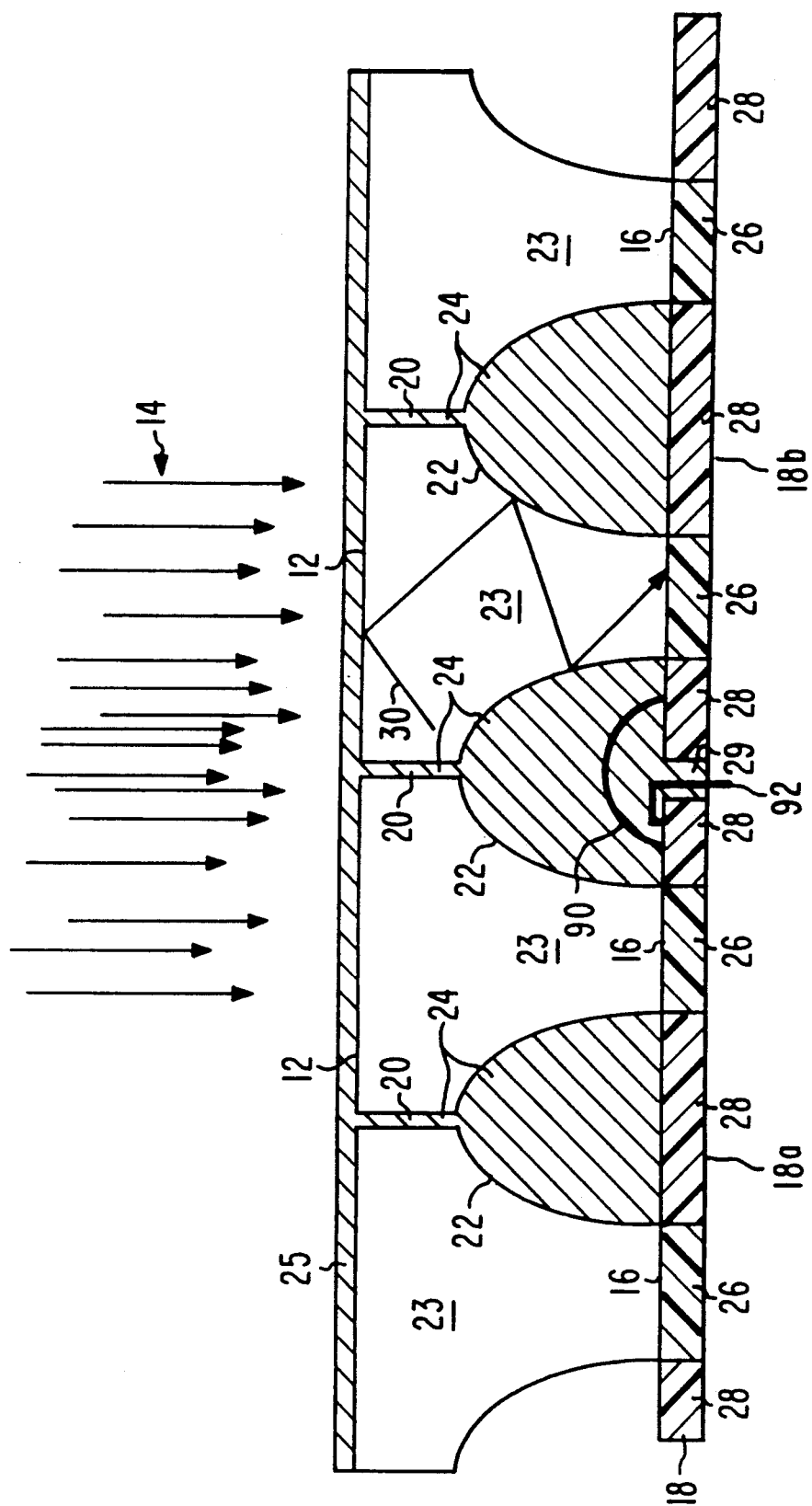
FIG. 2 is a cross-sectional view taken along line 2—2 of FIG. 1.

As shown in FIG. 2, grooves 20 and 22 are filled with a reflecting means 24 such as a metallization, e.g. Al, or an optically reflecting adhesive and filler. Preferably, reflecting means 24 comprises a metal oxide, e.g., $TiO_2$, secured to slab 10 by an epoxy glue binder. $TiO_2$ is a good choice for means 24 since it is white and therefore reflects most colors, and has a diffuse reflection so that the scattered light will be more likely to exit slab 10 and not be absorbed by it. Details about such a coating can be found in U.S. Pat. Nos. 4,560,877 and 4,563,584. In particular, the particles of $TiO_2$ should have a size of about the wavelength of the emitted photons (described below).

A portion 25 of reflecting means 24 is disposed over wide ends 12 in order to prevent the transmission of scintillation generated photons (described below) therefrom. A typical thickness for portion 25 is about 1 mm; other thicknesses can be used. If it is desired to image very low energy radiation, e.g., ultraviolet light, or X-rays with an energy below about 10 KeV, then portion 25 must be eliminated in order to prevent portion 25 from blocking the entry of said radiation into elements 23.

Means for providing a signal or light detector 18 comprises individual devices 18a and 18b, having optically active regions 26 including CCD imagers, photodiodes, etc., in order to detect the light present at narrow ends 16. The narrowness of narrow ends 16 allow for areas 28 in between regions 26 that can comprise amplifiers, connections, etc., thus resulting in detector 18 being compact. Further, said narrowness reduces cross-talk between elements 23. A butt joint 29 between devices 18a and 18b of detector 18 prevents dead stripes in the detector response or spatial sampling inhomogeneity in the resulting images. A lead 90 connects devices 18a and 18b, while a lead 92, and others like it (not shown), could extend through a circuit board (not shown) and be used to connect detector 18 to a power source (not shown) or to provide output signals.

In operation, X-rays 14 are incident upon wide end 12 and then enter slab 10, where they are primarily absorbed by the Gd atoms. In turn, the Gd atoms cause the creation of electron-hole pairs that in turn cause slab 10 to to scintillate, i.e., emit visible light photons. If slab 10 is made of the material described above and also in said patent, it will emit light at a wavelength of 611 $\mu$m, which is red, due to the presence of Eu atoms. Since said material is substantially transparent to this wavelength, the photons will be transmitted through elements 23, as shown by the path 30 of a particular scintillation photon. This photon is reflected at wide end 12 due to portion 25. Reflection then takes place at wide slots 22 due to the presence of reflecting means 24. Although not shown, if path 30 strikes grooves 20, a similar reflection occurs. Eventually, path 30 will be incident on active region 26. Since the providing means 18 is preferably made of Si, it is especially sensitive to light of this wavelength and it provides a electrical signal in response to the incident photon.

It will be appreciated that the reflections caused by reflecting means 24 reduces optical cross-talk between elements 23 as does the small area of narrow ends 16 and therefore results in a clearer image and higher efficiency. In particular, there is a higher modulation transfer function because the detector 18 image plane fill factor is nearly 100%. Further, the fact that circuit 18 is optically coupled to slab 10 by direct contact also helps keep efficiency high.

Figure 3:
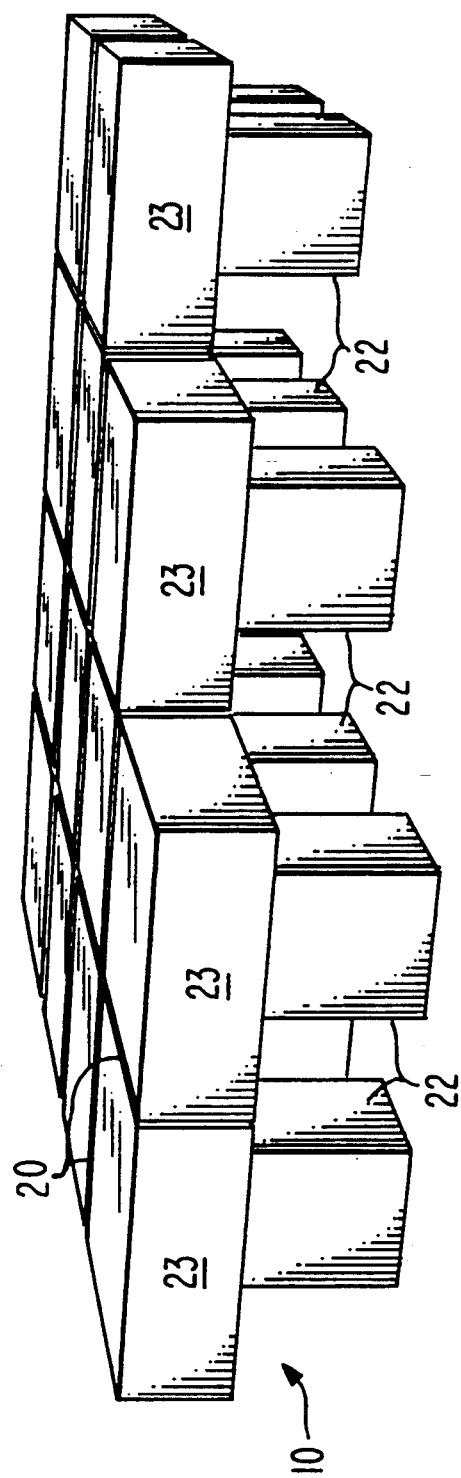
FIG. 3 is a broken away isometric view of a second embodiment of the mosaic array.
Figure 4A:
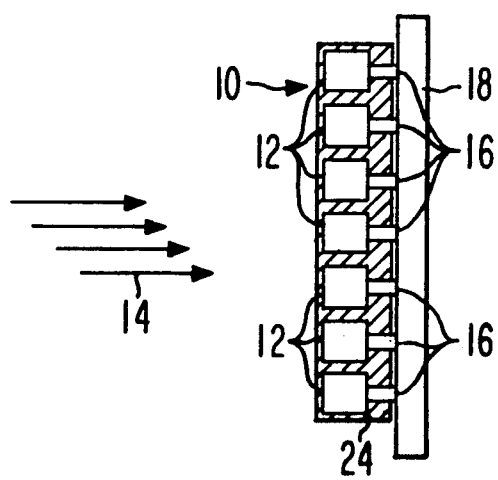
FIGS. 4a–4c show various schematic configurations of said array and photodetectors.

In a second embodiment of the slab 10 of the invention, as shown in FIG. 3, wide grooves 22 have a rectangular shape. Such grooves 22 can be made by a wide flat-faced saw. In general, other shapes for grooves 22 can be used. Grooves 20 and 22 are filled, and wide ends 12 covered, with reflecting means 24 as with the first embodiment. FIG. 4(a) shows the embodiment of slab 10 of FIG. 3 wherein photodetector 18 is directly mounted on narrow ends 16 and is therefore similar to FIGS. 1 and 2. A possible problem with the direct mounting arrangement of FIGS. 1 and 2, and 4(a) is that the adhesive used to mount detector 18 onto slab 10 may cause scattering and thus optical cross-talk between elements 23.

Figure 4B:
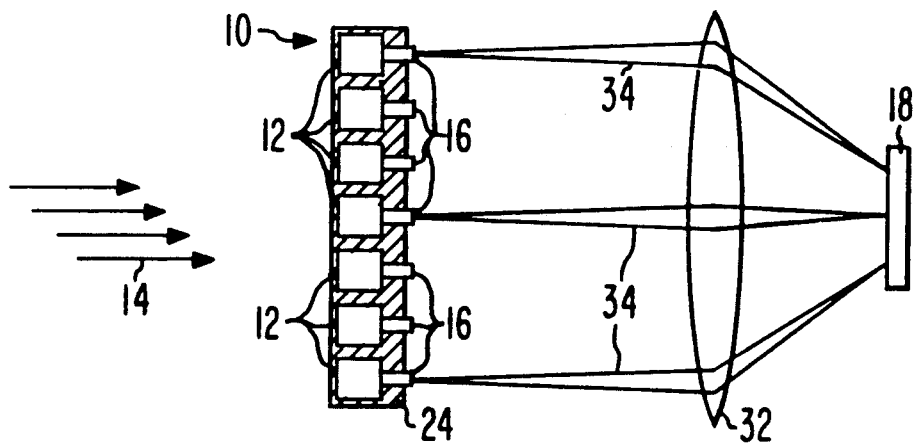

FIG. 4(b) and (c) show arrangements for reducing the cross-talk. In FIG. 4(b), wide ends 12 still face X-rays 14. However, detector 18 is no longer directly mounted on slab 10, but is disposed remotely therefrom. A double convex lens (other types can be used) 32 focuses light from each of the narrow ends 16 onto detector 18 (only light ray paths 34 from three of ends 16 are shown for clarity).

Figure 4C:
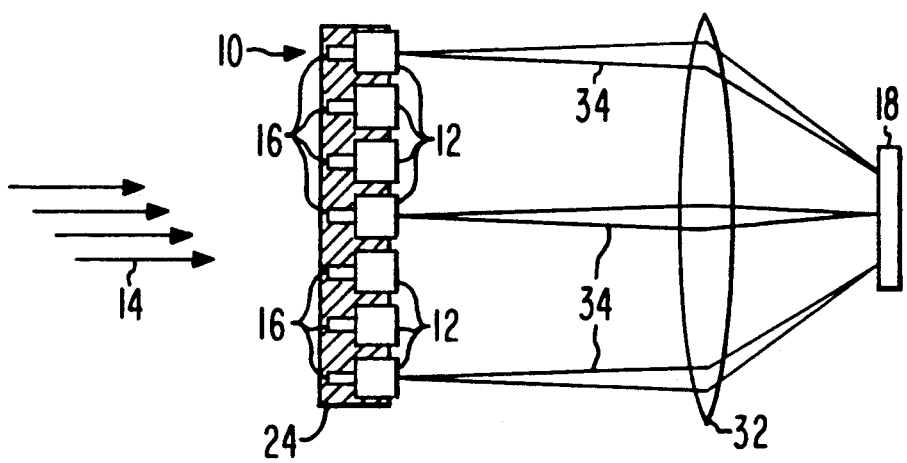

FIG. 4(c) shows a reverse arrangement, i.e., narrow ends 16 face incident X-rays 14 and wide ends 12 face lens 32 and detector 18. It is noted that reflecting means 24 covers the narrow ends 16. This embodiment is used to detect high energy X-rays, e.g., greater than about 150 KeV, which easily penetrate portion 25 of reflecting means 24 that is on narrow ends 16 and also that portion that is between ends 16 in grooves 22. Further, since most of the scintillation takes place near wide ends 12, and since wide ends 12 have a large area facing detector 18, efficiency is further increased. For the arrangement of FIG. 4(c), detector 18 can also be directly mounted on wide ends 12.

If desired in FIGS. 4(b) and (c), optical fibers (not shown) can be used instead of lens 32 to optically couple light from narrow ends 16 to detector 18 for improved efficiency. Also, in the embodiments of FIGS. 4(b) and (c), grooves 24 can be rounded, as best shown in FIG. 1.

Figure 5:
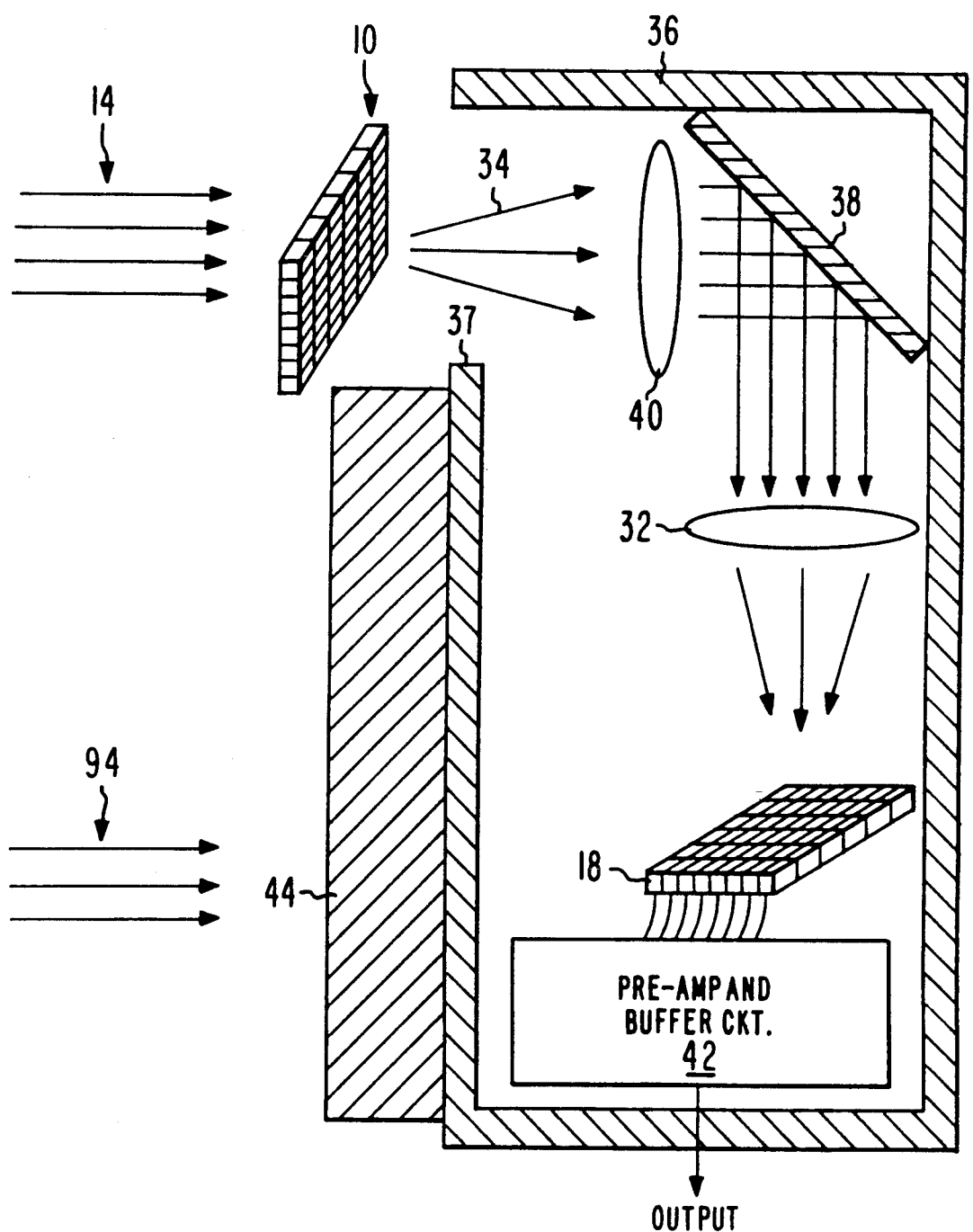
FIG. 5 shows is a schematic drawing of another embodiment of said mosaic and photodetectors.

FIG. 5 shows in more detail a way of implementing the embodiment of FIG. 4(c). Slab 10 is disposed outside of an enclosure 36. Light ray paths 34 pass through opening 37 in enclosure 36 and are incident upon a collimating lens 40 and then a diagonally mounted mirror 38. Lens 40 need not be present if slab 10 is suitably positioned and mirror 38 subtends a large enough field of view. From mirror 38 light is focused by a lens 32 onto detector 18, which can be cooled by known means, e.g. liquid $N_2$, Peltier effect, etc. The signals generated by detector 18 are applied to a preamp and buffer circuit 42. A shielding means 44, e.g., Pb, W, etc., shields detector 18 and circuit 42 from stray radiation 94. Circuit 42 provides a sampled analog output signal to an analog-to-digital converter (not shown). The converter output is applied to a display (not shown).

What is claimed is:

1. A detector for a first type of radiation, said detector comprising:

a plurality of radiation receiving means, disposed in a mosaic, for emitting a second type of radiation in response to incident radiation of the first type, each of said receiving means having wide and narrow ends defining communicating grooves between adjacent receiving means, said wide ends being adapted to receive the incident radiation of the first type;

means for reflecting said second radiation type filling each groove between each of said plurality of receiving means; and means for providing a signal in response to radiation of said second type, said providing means being optically coupled to said narrow ends.

2. The detector of claim 1 wherein said first type of radiation comprises X-ray and said second type of radiation comprises visible light.

3. The detector of claim 1 wherein said radiation receiving means comprises a sintered rare earth ceramic oxide.

4. The detector of claim 3 wherein said oxide comprises a Y:Gd X-ray absorber.

5. The detector of claim 4 wherein said absorber comprises between about 20 to 50 mole percent $Gd_2O_3$, between about one to six mole percent $Eu_2O_3$, with the remainder $Y_2O_3$.

6. The detector of claim 5 wherein said absorber comprises about 30 mole percent $Gd_2O_3$, about three mole percent $Eu_2O_3$, and about 67 mole percent $Y_2O_3$.

7. The detector of claim 6 wherein said absorber further comprises about 0.02 mole percent $Pr_2O_3$.

8. The detector of claim 1 wherein said radiation receiving means comprises a compound of bismuth.

9. The detector of claim 8 wherein said compound comprises BGO (bismuth germanate).

10. The detector of claim 1 wherein said reflecting means comprises $TiO_2$.

11. The detector of claim 1 wherein said providing means directly contacts said narrow ends.

12. The detector of claim 1 further comprising lens means for providing optical coupling between said providing means and said narrow ends.

13. The detector of claim 1 further comprising an enclosure having an opening, said plurality of radiation receiving means being disposed outside of said enclosure proximate said opening, said providing means being inside of said enclosure, and means for shielding said providing means disposed outside of and on said enclosure.

14. The detector of claim 1 wherein said reflecting means is also disposed on said wide ends.

15. A detector for a first type of radiation, said detector comprising:

a plurality of means, disposed in a mosaic, for emitting a second type of radiation in response to incident radiation of the first type, each of said means having wide and narrow ends, said narrow ends being adapted to receive the incident radiation of the first type; and detector means for providing a signal in response to radiation of said second type, said detector means being optically coupled to said wide ends.

16. The detector of claim 15 further comprising means for reflecting said second radiation type disposed between said plurality of means.

17. The detector of claim 16 wherein said reflecting means is also disposed on said narrow ends.

18. The detector of claim 16 wherein said reflecting means comprises $TiO_2$.

19. The detector of claim 15 wherein said emitting means comprises a sintered rare earth ceramic oxide.

20. A method of making a scintillation detector, said method comprising:

first scoring a plurality of wide grooves on a first side of a slab of scintillation material; and then scoring a plurality of narrow grooves on a second side of said slab respectively communicating with said plurality of wide grooves thereby providing a plurality of structurally independent, radiation receiving means having wide and narrow ends.

* * * * *